Aug. 29, 1939.  V. P. MATHEWS  2,171,157
PIVOTAL JOINT
Filed May 16, 1938
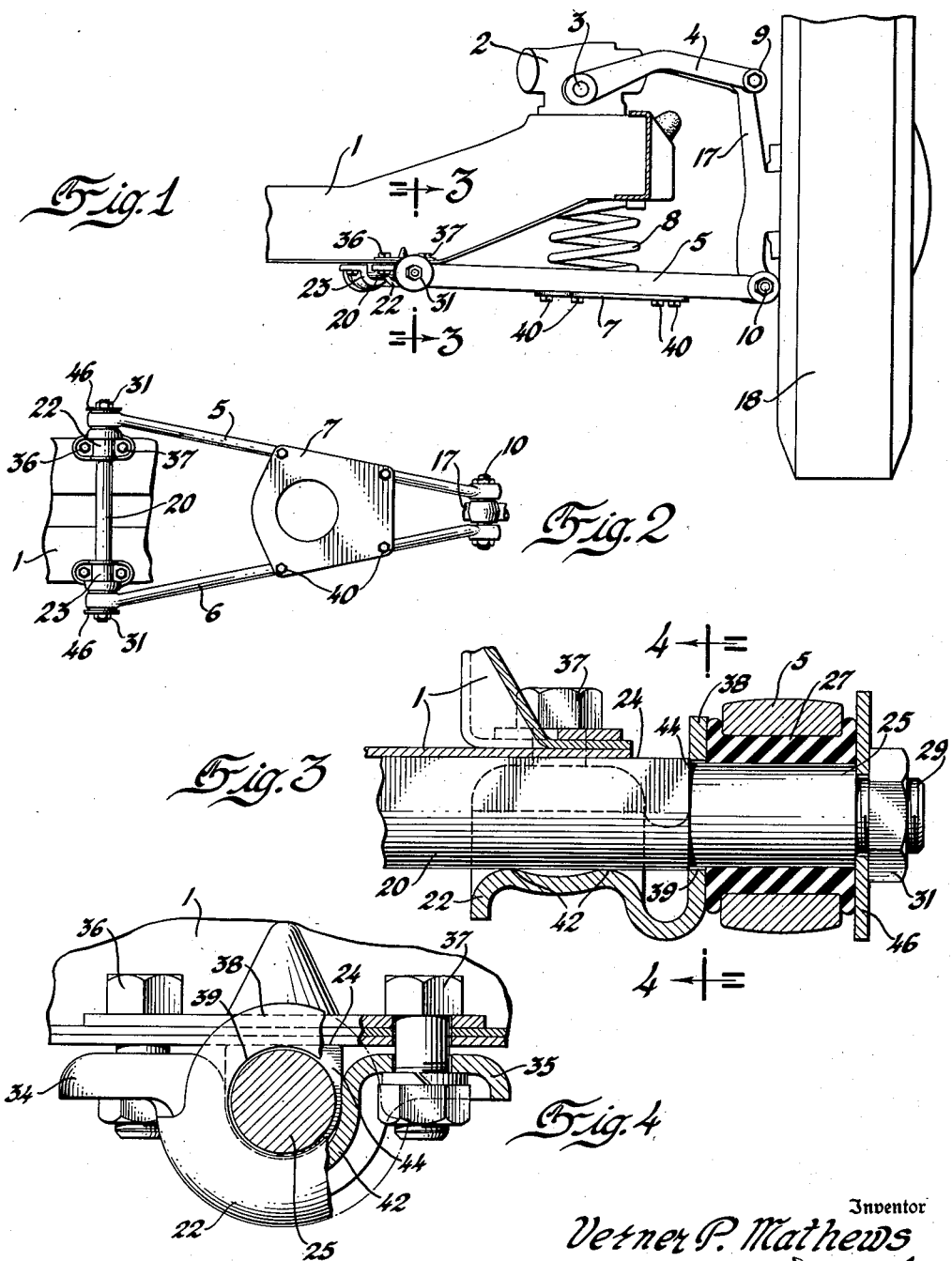
Inventor
Verner P. Mathews
By Blackmore, Spencer & Flint
Attorneys Patented Aug. 29, 1939

2,171,157

UNITED STATES PATENT OFFICE 2,171,157

PIVOTAL JOINT

Verner P. Mathews, Flint, Mich., assignor to General Motors Corporation, Detroit, Mich., a corporation of Delaware Application May 16, 1938, Serial No. 208,255

2 Claims. (Cl. 287—85)

This invention relates to a pivotal joint between a swinging link of a vehicle suspension system and the vehicle frame.

It relates especially to a pivotal joint between the vehicle frame and the spaced apart ends of a pair of arms bolted or otherwise suitably fastened together to form a V-shaped link.

The object of the invention is a particularly advantageous construction of parts which will be simple and cheap to make, including a pivot pin constituted by a shaft extending through axially aligned bores in the spaced apart ends of the V-shaped link and rigidly secured to the vehicle frame.

A further object of the invention is a construction in which the link is isolated from its shaft on bushings of rubber or other suitable resilient material, axially squeezed into binding engagement with the shaft and the aligned bores in the ends of the arms of the link, to provide for pivotal movement between the link and the shaft solely through internal distortion of the bushings.

A still further object of the invention is a pair of clamping means for rigidly securing the shaft to the frame, which will effectively prevent any turning or endwise movement of the shaft and at the same time provide abutments against which the resilient bushings may be axially squeezed.

The above and other objects of the invention will be apparent as the description proceeds.

The drawing shows the application of the invention to the suspension system for a dirigible wheel of a motor vehicle of the type in which the wheel is supported independently of the other wheels, at the outer ends of upper and lower laterally extending pivotal links.

In the drawing

Fig. 1 is a front elevational view of a part of a motor vehicle frame and one wheel with independent suspension to which the invention has been applied.

Fig. 2 is a view of a part of Fig. 1, showing the underside of the lower laterally extending link and its connections.

Fig. 3 is an enlarged sectional view of parts on line 3—3 of Fig. 1.

Fig. 4 is a part sectional view on line 4—4 of Fig. 3.

The vehicle frame includes a part 1, to the upper side of which a shock absorber 2, having an actuating spindle 3, is fixed. The upper pivotal support link 4 is keyed or otherwise suitably fixed to the actuating spindle 3 of the shock absorber.

The lower pivotal support link—V-shaped in plan—consists of two arms 5 and 6 rigidly connected together by a plate 7, constituting a seating for a spring 8 between the lower pivotal support link and the vehicle frame. It has a pivot axis on the vehicle frame constituted by a shaft 20.

The links 4 and 5, 6 are divergent from their pivot axes 3 and 20 respectively upwardly and downwardly to pivot pins 9 and 10 at their outer ends, to which a knuckle bracket 17 for the dirigible wheel 18 is connected.

The shaft 20 according to the invention is rigidly secured to the frame 1 by a pair of clamps 22 and 23 of pressed steel. It has a flat side 24 with reduced cylindrical portions such as 25 at each end thereof, extending respectively through axially aligned bores of resilient bushings such as 27, of rubber or the like, in each of the spaced apart ends of the arms 5 and 6; the ends of the shaft 20 projecting through the bushings such as 27 being further reduced in diameter and screw threaded as at 29 for nuts such as 31.

As shown most clearly in Figs. 3 and 4, each of the clamps 22 and 23 is a steel stamping of generally U-shaped corrugated form, with cupped flange portions 34 and 35 provided with holes for bolts 36 and 37 through which it is secured to the frame member 1. In addition, each of the clamps 22 and 23 has an end lug 38 with a hole 39 therethrough, through which the reduced portions such as 25 at each end of the shaft 20 may pass.

In assembling the joint, the opposite ends of the shaft 20 are first passed through the holes 39 in the lugs 38 of the clamps 22 and 23 respectively, with the U-shaped portions of the latter extending towards the middle of the shaft from the lugs 38. Then the disconnected arms 5 and 6 with their bushings such as 27 are passed over their respective ends of the shaft 20, and afterwards connected by the plate 7 to which both arms 5 and 6 are bolted by bolts such as 40.

It will be observed that the circumferential ridges 42 of the corrugations of the clamps embrace the shaft 20 and hold the flat side 24 thereof against the frame 1, so that the shaft 20 cannot turn around its axis. Endwise movement of the shaft relative to the frame is prevented by the end lugs 38 of the clamps, which engage the shoulders such as 44 formed by the reduced portions 25 at each end of the shaft. The end lugs 38 also conveniently constitute end faces or abutments, between which, and washers such as 46 on the screw threaded portions 29 of the shaft 20, the resilient bushings 27 may be axially squeezed by the nuts 31 into binding engagement with the shaft 20 and the arms 5 and 6, to provide for pivotal movement of the link 5, 6, relatively to the shaft 20 and the vehicle frame, by internal distortion of the bushings.

I claim:

1. A pivotal joint between the spaced apart ends of a pair of arms constituting a link of a vehicle suspension system, and the vehicle frame, including, a shaft having a flat side with reduced portions at each end thereof extending respectively through axially aligned bores of resilient bushings in the spaced apart ends of the said arms, a pair of generally U-shaped clamps adapted to clamp the shaft to the vehicle frame, each of said clamps having an end lug with a hole through which the reduced portions of the respective ends of the shaft extend, and means for securing said clamps to the vehicle frame in positions tightly embracing the shaft and holding the flat side thereof against the vehicle frame with said lugs abutting respectively against the shoulders formed on the shaft by the reduced portions at each end thereof, whereby both endwise and turning movement of said shaft is prevented; said lugs constituting abutments against which the resilient bushings may be axially squeezed into binding engagement with the shaft and the said arms, to provide for pivotal movement between the link and the vehicle frame by internal distortion of the bushings.

2. A pivotal joint between two members, including a shaft having a flat side adapted to be clamped to one of the members by a generally U-shaped clamp having an end lug encircling the shaft and abutting against a shoulder formed by a reduced end of the shaft extending through the lug; said reduced end of the shaft extending and protruding through a resilient bushing in the other member, and said protruding end of the shaft being screw threaded and provided with a nut whereby the shoulder on the shaft may be held tightly against the end lug of the clamp and the resilient bushing may be squeezed axially against said lug, into binding engagement with both of said members.

VERNER P. MATHEWS.